July 5, 1955  C. W. BRABENDER  2,712,209
PROCESS OF AND APPARATUS FOR SEALING RECEPTACLES
Filed Aug. 28, 1950  5 Sheets-Sheet 1
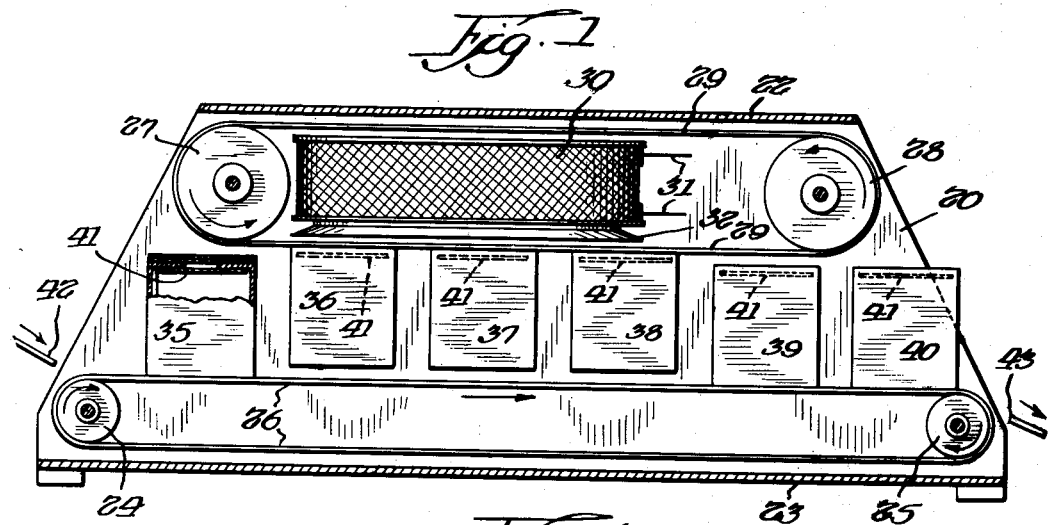
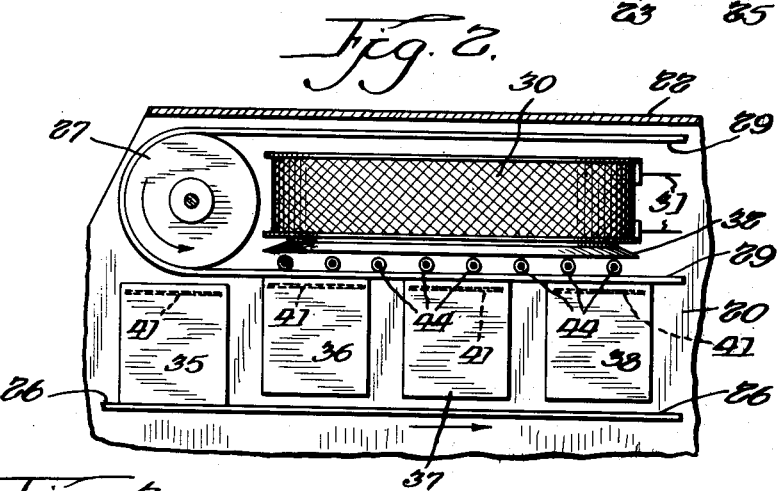
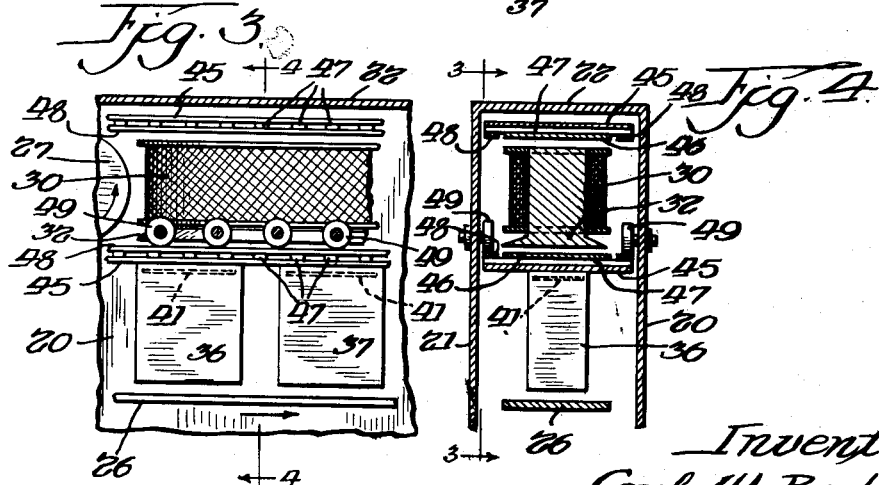
Inventor.
Carl W. Brabender.

July 5, 1955 C. W. BRABENDER 2,712,209
PROCESS OF AND APPARATUS FOR SEALING RECEPTACLES
Filed Aug. 28, 1950 5 Sheets-Sheet 2
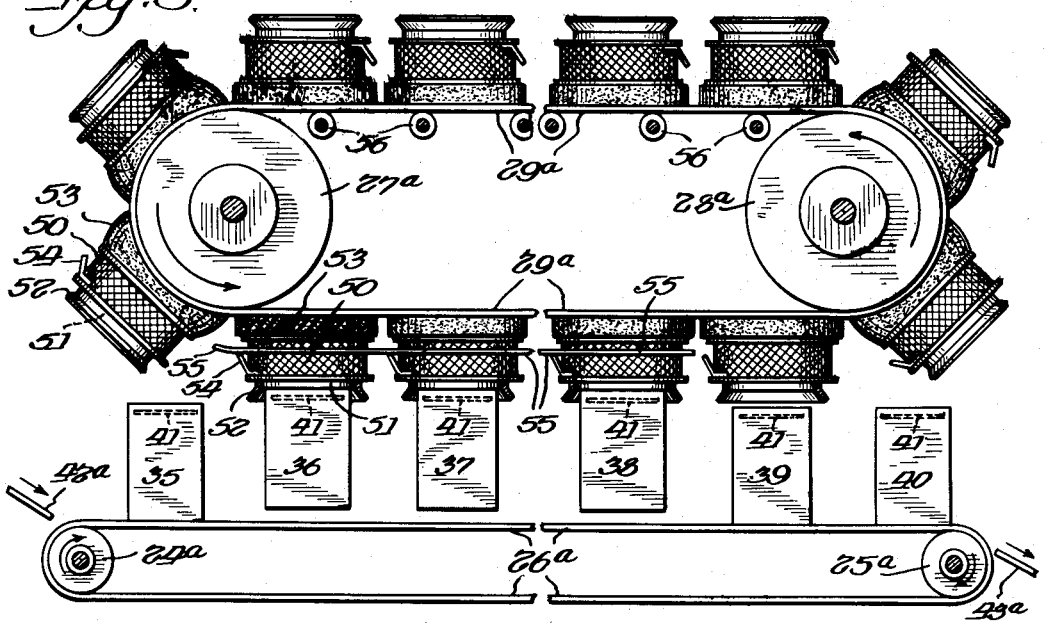
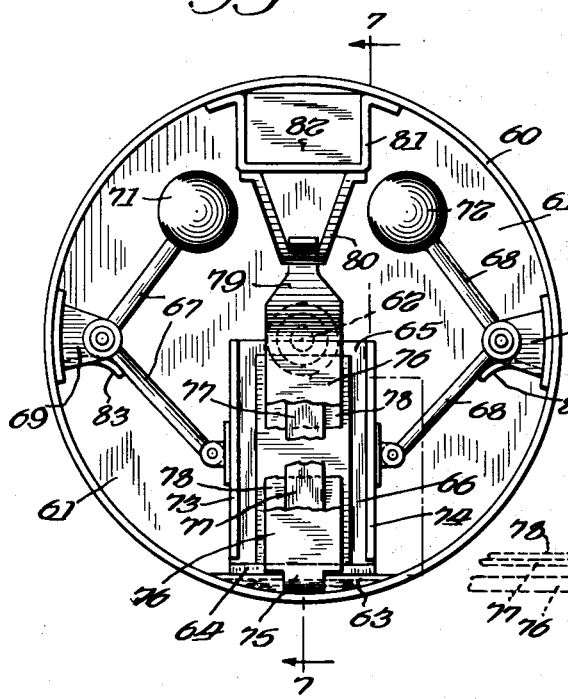
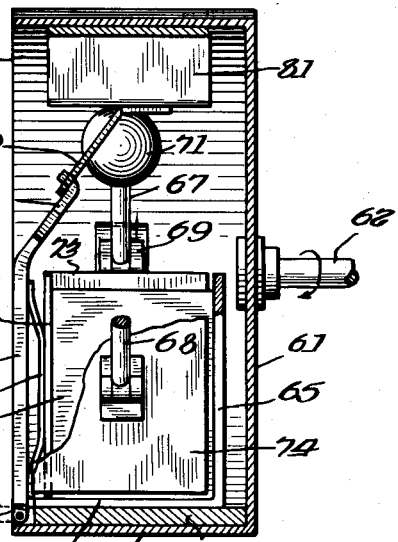
Inventor:
Carl W. Brabender.
By
George W. Porter Atty.

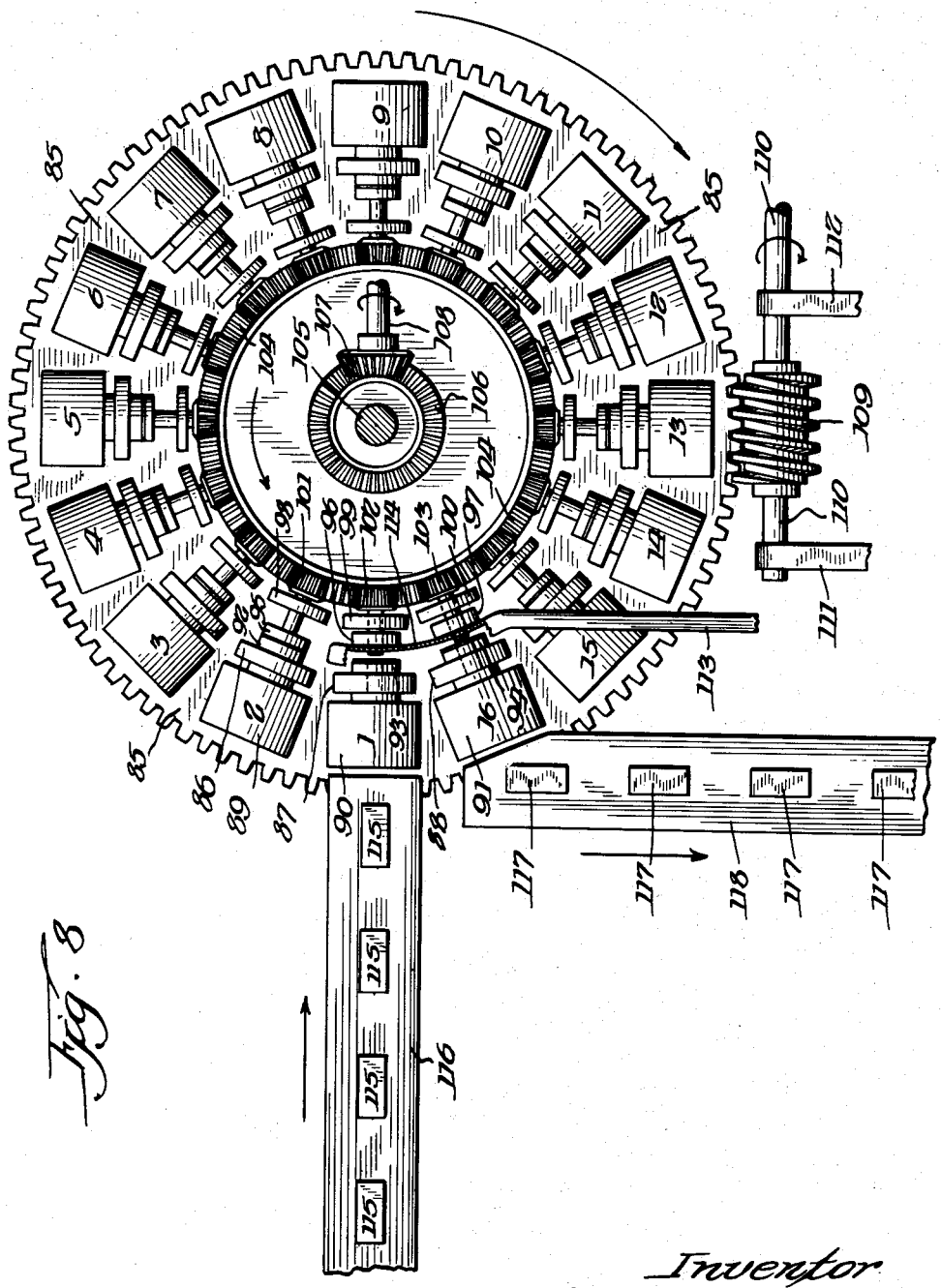

July 5, 1955 C. W. BRABENDER 2,712,209
PROCESS OF AND APPARATUS FOR SEALING RECEPTACLES
Filed Aug. 28, 1950 5 Sheets-Sheet 4
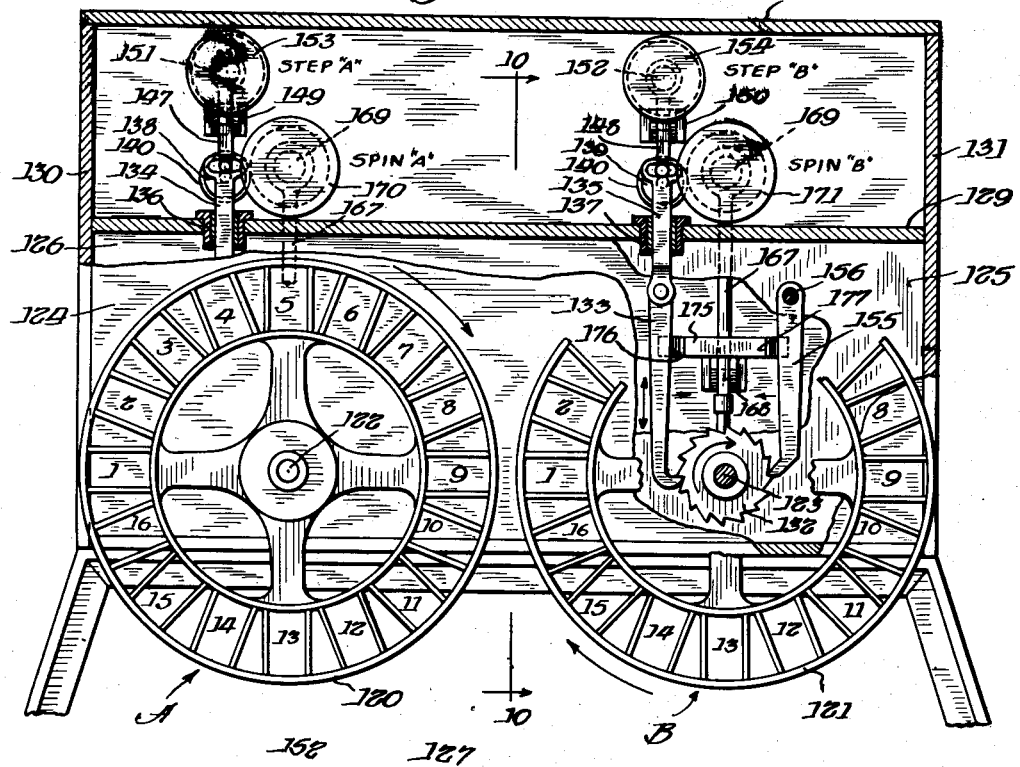
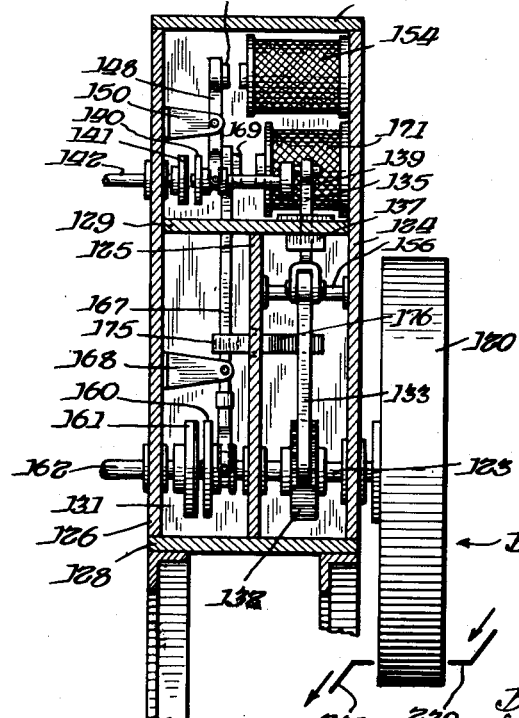
Inventor:
Carl W. Brabender
By George W. Porter Atty.

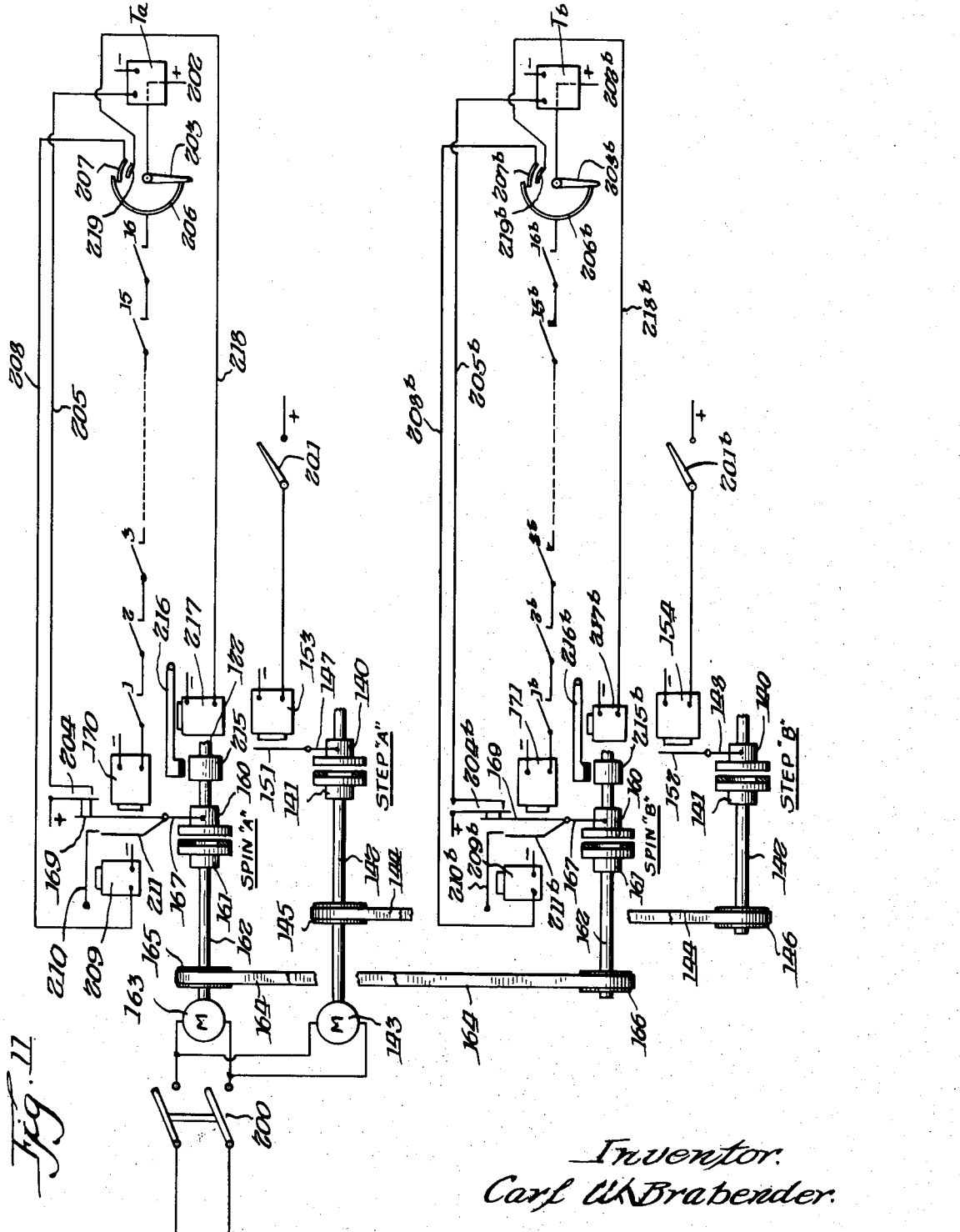

United States Patent Office 2,712,209
Patented July 5, 1955

2,712,209

PROCESS OF AND APPARATUS FOR SEALING RECEPTACLES

Carl W. Brabender, Minneapolis, Minn., assignor to Pillsbury Mills, Inc., Minneapolis, Minn., a corporation of Delaware Application August 28, 1950, Serial No. 181,902

15 Claims. (Cl. 53—16)

This invention is concerned with a process of and apparatus for sealing receptacles which have been filled with amounts of goods to be packaged. The receptacles may be of any desired type, for example, cartonlike containers, boxes or bags, such as are used for packaging goods in the food industries. Flour and various other milling and cereal products may be mentioned to give examples of the kinds of goods which are to be packaged.

Receptacles of this type should be sealed as perfectly as possible for a number of reasons, among which may be noted, first, contamination of the packaged goods in storage by infestation; and second, annoyance caused to storekeepers and customers by sifting, that is, by the seeping of the goods to the outside and soiling clothing in handling imperfectly sealed receptacles.

The problems which arise in the sealing of filled receptacles may be illustrated by referring to carton- or boxlike containers made from blanks forming sealing flaps or portions at opposite ends and at one side thereof. Such containers may be sealed reasonably perfectly at the bottom and sides, because blocking pressure may be applied to the glue-carrying sealing portions which are folded upon each other at the bottom and sides of the container, until the glue is set to form the receptacle ready to receive an amount of the product to be packaged. The sealing of the tops of such receptacles, after they have been filled, presents, however, a serious problem. As heretofore practiced, pressure could be applied against the glued and inwardly folded top sealing portions of such a receptacle in only one direction, namely, inwardly in the direction of its contents. Such contents may not completely fill the receptacle and form, at any rate, a yieldable mass, and the sealing pressure applied to the top sealing flaps or portions is thus propagated inwardly either against a void, that is, against an air space above the goods, or against the yieldable mass formed thereby. There is thus no backing to hold the sealing portions in place in firm sealing engagement throughout their entire contacting areas, and the pressure which is applied therefore cannot be effective to form a reasonably perfect seal that would protect the contents against infestation and against sifting to the outside. The sealing of filled baglike receptacles in which the top portions are folded upon each other to form the seal presents similar problems.

The principal object of the invention is to overcome the drawbacks and disadvantages indicated above, by the provision of a process of and apparatus for sealing filled recepticles by placing the inwardly folded glue-carrying top flaps or sealing portions thereof for a predetermined time under pressure which is substantially uniformly and equally effective against both the outside and the inside of such folded portions until the glue is set to hold the sealing portions in place to form a perfect seal.

This principal object may be realized, in accordance with one form of practicing the invention, by the provision of a layer of magnetic material disposed inside the top portion of a receptacle adjacent to or forming part of the corresponding inwardly folded glue-carrying sealing portions, and means for attracting said layer of magnetic material by magnetic force to hold the top surface of the outermost receptacle sealing portion in engagement with a backing member so as to place the sealing portions under pressure throughout their entire extent for the time required to set the glue.

The principal object of the invention may also be realized by rotating the filled receptacle through a circular path so as to subject its contents to centrifugal forces for the purpose of causing such contents to exert an outwardly directed pressure on the innermost folded sealing portion to hold the outermost sealing portion against a rigid backing member, thereby placing the folded portions under pressure until the glue is set to form a perfect seal which protects the contents against infestation and against sifting to the outside.

In accordance with another object, the means for sealing the receptacles, as contemplated by the invention, may be incorporated in a conveyor device which transports the filled receptacles from a filling machine to a desired point of discharge, storage or shipping.

The foregoing and additional objects and features will be brought out in the course of the detailed description of some embodiments of the invention which will be presently rendered with reference to the accompanying drawings. In these drawings, Fig. 1 shows in diagrammatic manner essential parts of a conveyor device for accomplishing the sealing of filled receptacles by magnetic means and for transporting the sealed receptacles to a desired point of discharge;

Fig. 2 illustrates in like diagrammatic manner a fractional view of the sealing and conveyor device of Fig. 1, with means for holding one flight of the conveyor belt movable with respect to the pole face of the magnet and properly spaced therefrom so that the belt may operate as a backing for the folded glue-carrying sealing portions of receptacles to be sealed;

Figs. 3 and 4 are diagrammatic sectional views of a part of the magnetic sealing and conveyor device showing means for reinforcing the backing member, that is, the conveyor belt, so as to hold it in proper position spaced from the pole face of the magnet and movable relative thereto;

Fig. 5 illustrates diagrammatically a modified magnetic sealing and conveyor device comprising a plurality of magnets carried on a conveyor belt, the pole face of each magnet forming a backing surface for engagement with the folded glue-carrying sealing portions of a receptacle to be sealed.

Fig. 6 shows a diagrammatic elevational front view of a simple device for subjecting a filled container to centrifugal force so as to utilize its contents as a means for exerting sealing pressure on the top sealing portions thereof, with parts broken away to indicate underlying details;

Fig. 7 represents a diagrammatic section through the centrifugal sealing device as seen when looking in the direction of the arrows approximately along lines 7—7 of Fig. 6;

Fig. 8 illustrates in diagrammatic form essential parts of an automatic centrifugal sealing machine employing the principles shown in Figs. 6 and 7;

Fig. 9 shows another embodiment of a centrifugal sealing machine with some parts in section or broken away to show interior details;

Fig. 10 is a diagrammatic sectional view of Fig. 9 showing interior parts when looking in the direction of the arrows approximately along lines 10—10 of Fig. 9; and Fig. 11 represents an elemental circuit diagram to aid in understanding the operation of the machine shown in Figs. 9 and 10.

The drawings are not to scale, diagrammatic throughout, and the dimensions and proportions of some parts have been distorted at the expense of other parts so as to bring out details more clearly than would be possible otherwise. Like parts are indicated by like reference numerals throughout the drawings. Known elements and details will be discussed only to the extent required for conveying an understanding of the invention.

An embodiment of the magnetic sealing and conveyor device will be described first with reference to Figs. 1–4. Numeral 20 shows the rear wall of a housing having a front wall 21, a top wall 22 and a bottom wall 23. Journalled in the front and rear walls are the rollers 24 and 25 supporting a conveyor, for example, an endless belt 26. Similarly journalled in the upper portion of the front and rear walls are the rollers 27 and 28, respectively, of a conveyor which may likewise comprise an endless belt 29. Disposed between the upper and lower flights of the belt 29 is a magnet comprising a coil 30 to which current may be supplied over the conductors 31 and having a core which terminates in the pole shoe 32. When current is supplied to the coil 30 of the magnet, any magnetic material positioned under the lower flight of the belt 29 will be attracted against such lower flight as a backing and will travel with the belt from left to right, as shown in Figs. 1 and 2.

The magnet 30, with its pole shoe 32, covers only a portion of the longitudinal space between the rollers 27 and 28, as shown in Fig. 1. This space may be designated as the "magnetic zone." At the right of this zone, from the right end of the pole shoe 32 to the roller 28, there is a nonmagnetic zone which may be designated as the "neutral zone." It follows therefore that any article which is moved into engagement with the belt 29 as a backing, by the attractive force of the magnet, will travel with the belt 29 from left to right only for the distance covered by the pole shoe 32 of the magnet, that is, within the magnetic zone, and the corresponding article will thereafter drop from the lower flight of the belt 29 upon the upper flight of the belt 26 for travel therewith toward the right end of the structure.

It is assumed that it is desired to seal filled carton-like receptacles shown in Figs. 1–5 in rectangular outline at 35 to 40, the receptacle 35 being shown partially in section. Each receptacle comprises the usual side walls, a side wall portion glued to one of the side walls inside thereof, top sealing portions extending from the front and rear walls, respectively, which are folded upon each other and upon the short inwardly folded inner sealing portions extending from the side walls. Each receptacle is filled with an amount of the desired product, in a known filling machine, which also places a suitable glue (any desired adhesive) on the sealing portions thereof and folds these portions inwardly ready for sealing, after inserting into each receptacle a sheet of magnetic material 41. The filled receptacles, each containing a sheet of magnetic material 41 disposed inside thereof adjacent to its folded top sealing portions, leave the filling machine successively and are successively delivered to the sealing and conveyor device by suitable means, shown in Fig. 1 the form of a platform 42. Leaving this platform, the receptacles are successively picked up by the upper flight of the lower conveyor belt 26 and are moved by this flight to the right, with their top ends underneath the lower flight of the belt 29. The receptacles are thus successively moved to the magnetic zone where the sheet of magnetic material in each receptacle is attracted by the magnetic force of the magnet 30, causing lifting of the entire receptacle from the lower belt 26 with its outermost sealing portion into sealing engagement with the lower flight of the upper belt 29. The belt 29 thus operates as a backing for the folded sealing portions of the receptacles and the sheet of material 41 presses outwardly against the folded sealing portions, thus placing these portions under uniform pressure throughout their entire extent. Each receptacle travels with the conveyor belt 29 throughout the magnetic zone, out of engagement with the belt 26, as shown in connection with the receptacles 36, 37, 38. The magnetic zone is of course sufficiently long and the speed of the conveyor belts is properly adjusted so as to retain the receptacles in sealing engagement with the lower flight of the upper belt 29 for a sufficient time to effect proper sealing. Upon completion of the sealing operation, the receptacles are successively dropped from the lower flight of the upper conveyor belt 29, at the neutral zone, upon the lower belt 26 into the positions assumed by the receptacles 39 and 40, for discharge travel to the right end of the apparatus. The discharge is effected by suitable means shown in Fig. 1 the form of a platform 43 which may terminate at a desired storage, shipping or other discharge point.

The magnetic material 41 disposed in each receptacle may be made in any suitable shape. If desired, it may be made, with the thought of meeting advertising purposes in addition to its sealing function, for example, in the form of a piece of sheet iron stamped to form part of a toy which the purchaser of the goods may assemble with other parts so as to form a desired structure. The magnetic member may be inserted into the container, as such, or it may be coated or wrapped or provided with a suitable and desired cover. Instead of inserting a magnetic member, it is also possible to provide the magnetic material on the sealing flaps or portions by spraying or the like, either as a part of the adhesive or underlying the adhesive.

Fig. 2 shows a portion of the structure of Fig. 1, together with idler rollers 44 which are journalled between the front and rear walls to keep the lower flight of the upper belt 29 spaced from the face of the pole shoe 32 of the magnet. The attractive force exerted by the magnet 30 is again effective to attract the magnetic members or layers 41 disposed within the various receptacles for the purpose of moving the receptacles into sealing position against the lower flight of the belt 29, keeping them in engagement with the belt as a backing throughout the extent of the magnetic zone. The belt is pressed against the rollers 44 by the pressure exerted thereon by the receptacles, and is free to move. The rolling or massaging action of the rollers 44 on the folded sealing portions of the receptacles benefits the final sealing operation.

The structure shown in Figs. 3 and 4 provides a reinforced belt comprising an outer belt layer 45 and an inner belt layer 46. Between these belt layers are provided transverse crossbars or ribs 47 made of suitable relatively rigid nonmagnetic material, which may be a metal or a plastic material. The opposite ends of these reinforcing ribs extend in transverse direction beyond the edges of the inner belt layer 46, as particularly shown in Fig. 4, and secured thereto are endless nonmagnetic strips 48 which operate in the manner of rails in coaction with idler rollers 49 which are journalled in the front and rear walls. The composite belt absorbs the pressure exerted thereon by the receptacles in magnetic sealing engagement therewith and is guided by the idler rollers 49 which transfer the sealing pressure to the housing walls while keeping the belt properly spaced from the face of the pole shoe 32 and free to move.

The sealing and conveyor device illustrated in Fig. 5 employs a plurality of individual magnets mounted on a suitable conveyor, for example, a belt 29a (corresponding to the belt 29 of the previously described structure), each magnet comprising a coil 50 surrounding a core which terminates in the pole shoe 51. A positioning skirt 52 is carried by each magnet so as to guide a receptacle for sealing purposes into engagement with the face of the pole shoe 51. Each magnet is flexibly secured to the belt 29a, for example, by means of a rubber pad 53 which may be vulcanized to the belt and to the magnet structure, respectively. The pad can flex when the corresponding magnet goes through the arcuate path around the rollers 27a—28a at the opposite ends of the conveyor structure. The lower conveyor belt comprises the rollers 24a and 25a supporting the belt 26a, which corresponds to the belt 26 of the previously described structure. Each of the containers 35—40 is equipped with a magnetic member 41, as before.

Each of the magnets carries a pair of brushes, one such brush being indicated with each magnet, as shown at 54. The brushes are connected with the terminals of the corresponding magnet coil 50. The apparatus is also equipped with two bus bars, one being visible at 55, which are suitably connected to current.

The operation is similar to the one described in connection with Figs. 1–4, except that the successively delivered receptacles are picked up for sealing one by one by individual magnets. The receptacles are delivered from the filling machine to the conveyor and sealing device by suitable means shown in the form of a platform 42a (corresponding to platform 42 of Fig. 1) and are picked up by the belt 26a and moved to the right. Only those magnets are energized at any one time which are within the magnetic zone of the device. Each magnet moves into energizing position, after going through its arcuate path around the roller 27a and starting its longitudinal travel, by engagement of its brushes 54 with the bus bars 55, thus producing an attractive force which persists throughout the magnetic zone, when the brushes of the corresponding magnet leave the bus bars 55. As shown in the drawing, three of the magnets are thus energized at any one time, moving through the longitudinal path above the belt 26a. The receptacles to be sealed are picked up one by one by the magnets, continuing their travel to the right out of engagement with the lower belt throughout the magnetic zone, the travel being adjusted so as to provide sufficient time for the setting of the glue which has been placed on the sealing portions of the respective receptacles before delivery to the sealing device. Each magnet, after leaving the magnetic zone and disconnecting its brushes 54 from the bus bars 55, drops its sealed receptacle onto the lower belt which moves it for discharge to a desired point over the means shown at 43a.

It is understood of course that the travel speed of the conveyor belt is synchronized with the speed of delivery of receptacles to be sealed. Slight deviations from the synchronous operation are compensated by the flaring skirt 52 carried by each magnet, which aids in positioning each receptacle in sealing pressure engagement with the face of its associated pole shoe.

Idler rollers 56 may be provided for supporting the upper flight of the belt 29a. The lower flight of the belt may require support to prevent undesired downward deflection due to the weight of the magnet structures. The belt may for this purpose be of the composite type previously discussed with reference to the structure shown in Figs. 3 and 4, having reinforcing ribs or crossbars and endless bands connecting the opposite ends of the crossbars, functioning as rails in engagement with suitable supporting rollers such as 49 shown in Figs. 3 and 4. In this case the supporting rollers are of course provided at the sides and underneath the lower flight of the composite belt to prevent its downward deflection.

The machines of Figs. 1–4 and Fig. 5 may operate entirely automatically. Receptacles prepared for sealing are in each case automatically delivered over the means shown at 42 and 42a, respectively, and are automatically moved into sealing position by the corresponding conveyors 26 or 26a, from which they are automatically picked up for magnetic sealing by the respective magnetic means. They remain in pressure-sealing position for a predetermined period of time throughout their travel through the corresponding magnetic zone and are thereafter automatically dropped on the lower conveyor for discharge. It is understood, of course, that the machine may be operated manually by an attendant. In the case of the structure shown in Figs. 1–4, the attendant may place the receptacles in sealing engagement with the upper belt as a backing, and in the case of the machine shown in Fig. 5 he may insert the receptacles to be sealed successively into the flaring skirts 52 of the magnets, each for sealing pressure engagement with its pole face.

Suitable sprocket operated structures may take the place of the conveyor belts shown in the above described Figs. 1–5.

Receptacles of the bag type may be sealed in the machines in a similar manner as the cartonlike receptacles. The top portions of each bag are for this purpose folded upon each other to form sealing flaps which are provided with suitable glue. Underneath one of the inner sealing flaps is inserted a layer of magnetic material, as before. The sealing operation corresponds to that discussed in connection with the sealing of cartonlike receptacles.

The sealing device shown in Figs. 6 and 7 utilizes centrifugal forces for sealing the folded glue-carrying sealing portions or flaps of the receptacles. It comprises a drum having the cylindrical side wall 60 and an end wall 61 which is mounted on a rotatable shaft 62. A supporting block 63 is disposed in the drum, as shown, carrying an angular bracket member having the bottom wall 64 and the rear wall 65. This bracket member forms part of a cage for receiving a receptacle 66 for sealing, which is placed into the device in inverted position, with its outermost top sealing portion in engagement with the bottom wall 64 as a backing. A pair of angular arms 67—68 is provided, each pair being pivotally mounted in a bracket, as shown at 69—70. The latter brackets are secured to the cylindrical wall 60 of the drum. One arm of each pair of angular arms carries a weight, as indicated at 71–72, respectively, and pivotally mounted on the free end of the second arm of each pair is a plate, as indicated at 73–74, respectively. These plates form movable parts of the cage for receiving the receptacle 66. Hingedly mounted in the block 63 at 75 is a front plate 76 carrying on its inside a leaf spring 77 which in turn is connected with an inner plate 78, the latter for engagement with a side wall of the receptacle 66. The front plate 76 is provided with a hooklike extension 79 for engagement with a latch 80. Numeral 81 indicates a bracket forming a compartment for receiving a counterweight 82. The purpose of the counterweight is to balance the weight of the parts in the lower portion of the device, as shown in the figures, so as to avoid undue stress on the structure, in the presence of centrifugal forces. The counterweight is removable and may be replaced by one of different weight, in accordance with the weight of the receptacles to be sealed. It will be observed that the cage for the receptacle 66 has three movable walls 73, 74, 78 and the structure can thus accommodate receptacles of different size and weight. Each of the brackets 69—70 carrying the angular arms 67—68 is provided with a stop member indicated at 83—84, respectively, for limiting the outward displacement of the side plates 73—74 of the receptacle cage.

The operation of the device is believed to be self-evident from the drawings discussed above, but may be briefly summarized as follows:

The attendant first releases the latch 80 to free the hook 79 of the front plate members 76/78 and places these front plate members in open position, as indicated in dotted lines in Fig. 7. The filled receptacle 66, which is to be sealed, and the top sealing portions of which have been provided with glue and folded inwardly, is then placed in inverted position into the cage with one side backed against the rear wall 65 and with the outermost sealing portion in backing engagement with the bottom wall 64. The front plate members 76/78 of the cage are then placed in closed position, as shown in the figures in full lines, the hook 79 locking in back of the latch 80 and thus holding the receptacle 66 in place. It will be observed that the front plate members 76/78 are spaced by the leaf spring 77, thus permitting displacement relative to each other, so as to allow for holding receptacles 66 of varying width. The drive of the drum (not shown) is then started, to rotate it by means of the shaft 62. Incident to such rotation, the weights 71—72 move outwardly by centrifugal force, displacing the cage walls 73—74 inwardly against the side walls of the receptacle 66. Receptacles of varying thickness may thus be inserted in the cage for sealing purposes. The centrifugal forces propel the contents of the receptacle 66 outwardly, thus exerting pressure on the sealing portions thereof which are backed against the bottom cage wall 64. The force exerted therefore places the folded sealing portions of the receptacle under pressure which is uniformly effective throughout their entire extent. The adjustable cage walls 73—74 are held in pressure engagement with the front and rear walls of the receptacle 66, and the inner front plate 78 and the rear wall 65 are in pressure engagement with the side walls of the receptacle, preventing bulging of its walls responsive to the outward pressure of the material therein which is subjected to centrifugal force. The spinning, that is, the rotation, and consequent centrifugal action of the device is continued for a time sufficient to allow for the setting of the glue, so as to perfect the seal which protects the contents of the receptacle against infestation and sifting. The sealed receptacle is removed from the device upon stopping the rotation thereof at the termination of a predetermined period of time which may be controlled and signalled by suitable timing means.

The device of Figs. 6 and 7 may be employed as one of several units in a continuous automatic sealing machine, the essential parts of which are diagrammatically indicated in Fig. 8. The machine comprises a base plate 85 carrying bearing brackets such as indicated at 86—87—88. Rotatably journalled in each bearing bracket is a drum, as indicated at 89—90—91. Each drum may contain a cage mechanism such as discussed in connection with Figs. 6 and 7. The drive shaft of each drum carries a driven friction clutch member, as indicated at 92—93—94, respectively, each for friction drive engagement with a drive clutch member indicated at 95—96—97, respectively. These latter clutch members are rotatably mounted in associated brackets 98—99—100 which are secured to the base plate 85, and the shaft of each such drive clutch member carries a bevel gear, as indicated at 101—102—103, respectively. These bevel gears are in mesh with a ring gaar 104 carried on a plate which is rotatably mounted on the shaft 105. An inner ring gear 106 is provided on the plate which is driven by the bevel gear 107 through the medium of a suitable drive 108. The base plate 85 is rotated by a worm 109, the drive shaft 110 of which is journalled in the bearing brackets 111—112. An arm 113 is provided which carries a cam portion 114. The means for delivering to the machine receptacles 115 to be sealed is indicated at 116, and the means for discharging the sealed receptacles 117 from the machine is indicated at 118.

The machine thus comprises the rotatable base plate 85 carrying a plurality of drums such as 89—90—91 which are mounted for individual rotation thereon and for rotation therewith through a circular path, each drum forming a compartment for receiving a receptacle for sealing, and each having cage means such as discussed in connection with Figs. 6–7 for holding a receptacle in sealing position. Sixteen such drums (compartments) have been shown and indicated by corresponding numerals 1–16, but more or less may of course be provided. The machine operates as follows:

The attendant starts rotation of the worm 109, to rotate in clockwise direction the base plate 85 and therewith, through a circular peripheral path, all of the centrifugal sealing compartments or units 1–16. Rotation of the shaft 108 carrying the bevel gear 107 is then started, to rotate the plate carrying the ring gears 104 and 106, thus causing rotation of the various bevel gears such as 101—102—103 of the centrifugal units 1–16. All units 1–16 partake at any one time in the rotation of the base plate 85. Each unit rotates individually relative to the base plate 85 throughout the time of its circular travel from position 2 to position 15. The individual rotation of each unit, relative to the base plate 85, stops when such unit arrives in position 16, and the unit remains in stop position while travelling with the base plate through positions 16 and 1. The stopping of the individual rotation of the units in positions 16 and 1 is accomplished by the cam 114 in engagement with the drive clutch members of the corresponding units, for example, the drive clutch members 96—97 of the drums 90 and 91 (units 1 and 16). These drive clutch members are disengaged from driving engagement with their associated driven clutch members 93 and 94 by riding upon the cam 114 as each unit moves from position 15 to position 16. The cam 114 is shown for the sake of convenience, as being in direct engagement with the clutch members 96—97 to accomplish the declutching. It is understood that this is merely a simplified showing and that each drive clutch member such as 95—96—97 is associated with a suitable clutch-operating member for coaction with the cam 114. The attendant inserts into the compartment 90 a receptacle 115 to be sealed, in the manner described in connection with Figs. 6 and 7, when the compartment is in position 1. As the rotation of the base plate 85 continues, the drive clutch member 96 leaves the cam 114 and moves into clutching engagement with its driven clutch member 93, the corresponding unit assuming the position 2, and the unit 16 assuming the position of unit 1. The unit 1 now rotates individually relative to the base plate 85 and, while thus rotating, is moved through a circular path, assuming successively the positions 3 to 15. The receptacle 115, which has been inserted into the unit 1, is subjected during this phase of the operation to centrifugal forces for sealing purposes, as described before. Unit 16 having assumed the position of unit 1 and still standing still, that is, not being rotated about its own axis relative to the base plate 85, due to disengagement of its driven clutch member 94 from the drive clutch member 97, is supplied by the attendant in position 1 with a receptacle 115 to be sealed, and in its further rotation assumes successively the positions 2–15 in which it is rotated individually relative to the base plate 85 for centrifugal sealing purposes. Units 14 and 15 meanwhile have arrived at the positions in which are shown the units 1 and 16, and the attendant successively inserts thereinto receptacles 115 to be sealed. The operation continues, as an empty unit assumes the position 1, the attendant inserting therein a receptacle to be sealed. The units carrying receptacles for sealing are thus successively angularly moved in clockwise direction, and at the same time each unit is rotated around its own axis so as to provide the centrifugal forces required for the sealing of its glue-carrying folded sealing portions. The travel time, in clockwise direction, of the units from the positions 2–15 is controlled by suitable timing means, in accordance with the sealing requirements; and, when a unit arrives in position 15, its folded top sealing portions are therefore properly joined to protect the contents against infestation and sifting. Each unit is successively declutched in its discharge position 16 by the cam 114 and stops rotation around its own axis. The attendant removes the sealed receptacle, and as the unit arrives in its receiving position 1 he inserts therein a receptacle to be sealed.

The above described operations require an attendant. It is understood that they may be made entirely automatic by the provision of suitable means for inserting into each unit in its receiving position 1 a receptacle to be sealed and for removing the sealed receptacle from each unit for discharge onto 118 when such unit arrives at its discharge position 16. Electrically operated means, including declutching and timing means such as illustrated in Figs. 9–11 may be employed for governing the operations of the machine.

The embodiment shown in Figs. 9–11 provides two centrifugal sealing units A and B. Each unit comprises a wheel-like rotatably mounted circular holder indicated in Figs. 9 and 10 at 120 and 121, respectively. Each holder forms a plurality of peripherally disposed compartments numbered 1–16, inclusive, but more or less may of course be provided. Each compartment contains means for receiving a receptacle to be sealed, including a cage having adjustable plates for holding the receptacle in sealing position, as particularly discussed with reference to Figs. 6 and 7. The machine is started by rotating the holder 120 or 121 of one or the other unit A or B, respectively, step by step, to move its compartments 1–16 successively relative to a predetermined loading and discharge position in which a receptacle to be sealed is inserted into each compartment. After the corresponding holder has been loaded with receptacles, it is caused to rotate in a continuous motion so as to spin the receptacles through a circular path, for a predetermined time, for the purpose of subjecting the contents thereof to centrifugal forces to accomplish the sealing of their folded glue-carrying sealing portions by placing such portions under uniform pressure against a backing member formed by the corresponding compartment cage. While such first holder is rotated in continuous motion, the holder of the second unit is subjected to step-by-step rotation and is loaded with receptacles to be sealed in a similar manner. The continuous rotation of the first holder is stopped at the termination of the predetermined period of time required for sealing of its receptacles (during which time the second holder is loaded), and the first holder resumes its step-by-step rotation to move its compartments successively relative to the predetermined loading and discharge position in which the sealed receptacles are discharged from its compartments and new receptacles are inserted thereinto for centrifugal sealing. The second holder which has meantime been loaded is now subjected to continuous rotation to accomplish the centrifugal sealing of its receptacles. The interplay continues. While one loaded holder spins in a continuous motion for perfecting the sealing of its receptacles, the other holder rotates in a step-by-step motion for discharge and re-loading, respectively. All operations are automatically controlled. Details of the structure will now be described, first, with reference to Figs. 9 and 10.

The shafts 122—123 of the two holders 120—121 are journalled in the front wall 124 and a partition wall 125 of a housing having the rear wall 126, the top and bottom walls 127—128, a transverse partition 129, and end walls 130—131. Each shaft 122—123 carries a ratchet wheel, as indicated at 132. A drive pawl 133 is provided for each ratchet wheel, and each drive pawl may be reciprocated by a plunger such as indicated at 134—135, respectively. A guide bushing 136 is provided for the plunger 134 and a similar guide bushing 137 is provided for the plunger 135. Each plunger 134—135 coacts with a crank, as indicated at 138—139. The shaft of each such crank carries a friction clutch member 140 for clutching engagement with a drive clutch member 141, the latter being driven by a rotatable shaft 142. As indicated in Fig. 11, the shafts 142 of the two units A and B may be driven by a motor 143 through the medium of a suitable drive, for example, a belt 144 engaging the pulleys 145—146. Each clutch member 140 is operable by an arm, as indicated at 147—148, respectively, these arms being pivotally mounted in brackets shown at 149—150. Each arm 147—148 carries an armature 151—152, respectively, each for coaction with an associated magnet, as shown at 153—154. It will be seen therefore that, if one of the magnets 153—154 is energized, it will have attracted its associated armature such as 151 or 152, and will have displaced in clockwise direction (as seen in Fig. 10) its clutch-actuating arm 147 or 148, respectively, to clutch its coacting crank 138 or 139 to its respective drive clutch member 141, it being assumed of course that the shafts 142 are being rotated by the motor 143 (see Fig. 11). The stepping drive pawl 133, 134 of the corresponding unit is thus reciprocated and drives its ratchet associated 132 in clockwise direction, as seen in Fig. 9, thus rotating the associated holder 120 or 121 of the corresponding unit A or B. Each ratchet 132 also coacts with a detent shown in Fig. 9 at 155, the detent being rotatably mounted on a rod 156 which extends between the front wall 124 and the partition 125. The stepping drive pawl 133 and also the detent 155 are biased by suitable spring means angularly inwardly, that is, in the direction of the axis of the associated ratchet wheel 132, as indicated by arrows in Fig. 9. Reciprocation of the stepping drive pawl 133 thus moves the corresponding holder 120 or 121 of the respective unit A or B step by step in clockwise direction, as seen in Fig. 9.

The shafts 122—123, respectively, of each unit extend rearwardly of the vertical partition 125 and each shaft carries a driven clutch member, as indicated in Fig. 10 at 160. This driven clutch member is provided for driving coaction with a drive clutch member 161 which is rotatable by a shaft 162. The drive shafts 162 of the two units may be rotated in common by a motor 163 and by a suitable drive means shown in Fig. 11 in the form of a belt 164 in engagement with pulleys 165—166. Each clutch member 160 may be operated by an arm 167 which is pivotally mounted in a bracket 168. Each arm 167 carries an armature 169 which may be attracted by a magnet, as indicated at 170—171, respectively. It will be seen therefore that, if one of the magnets 170—171, which are the spinning clutch magnets, is energized, it will have displaced its arm 167 in clockwise direction, as seen in Fig. 10, and will have placed its driven clutch member 160 in driving engagement with the drive clutch member 161. The corresponding shaft 122 or 123 of the respective unit A or B is thus in continuous driving position, rotating or spinning the associated holder 120 or 121, of the respective unit A or B in a continuous motion.

The stepping mechanism of each holder 120 and 121 must be disabled for the time of continuous rotation of such holder. Each arm 167 carries for this purpose a crosspiece 175 to which are secured two cam arms 176—177. The cam arm 176 coacts with the stepping pawl 133 and the cam arm 177 coacts with the detent 155 of the corresponding unit. When the respective spinning clutch magnet 170 or 171 is energized and displaces its clutch arm 167, as described, it also moves its crosspiece 175 and the cam arms 176—177 carried thereby to the right, as seen in Fig. 10, and perpendicular out of the plane of drawing, as seen in Fig. 9, for the purpose of moving the stepping pawl 133 in clockwise direction out of engagement with the ratchet wheel 132 and for moving the associated detent 155 counterclockwise out of engagement with the ratchet 132. In other words, when the shaft 122 or 123 is in continuous driving engagement with its drive shaft 162, the stepping mechanism is disconnected and remains ineffective. The associated stepping clutch magnet may remain operated, keeping the coacting crank 138 or 139 in driving engagement with its shaft 142, and the corresponding stepping pawl 133 may thus continue its reciprocating motion. Such motion will be ineffective because the pawl has been lifted from engagement with the ratchet 132. The pawl merely idles. The detent 155 has likewise been disabled, and the corresponding holder can freely rotate in driving engagement with the shaft 162.

It will be seen from the foregoing explanations that each circular holder 120 and 121 can be selectively operated (a) to rotate step by step, by energization of its stepping control magnet such as 153 or 154, respectively, which clutches its associated crank (138 or 139) in driving engagement with the shaft 142, to reciprocate its stepping pawl 133, and (b) to rotate in a continuous motion, by energization of its spin control magnet (170 or 171) which clutches its drive shaft (122 or 123) in driving engagement with the shaft 162, thereby disabling its stepping mechanism comprising the pawl 133 and coacting detent 155.

Additional structure will be supplied, and the operation of the machine will now be explained with reference to Figs. 9–10, and particularly with reference to Fig. 11:

The attendant starts the machine by actuating the switch 200 (see Fig. 11) to connect current to the stepping motor 143 and to the spinning motor 163. The motor 143 rotates the shafts 142 carrying the driving clutch members 141 for the stepping mechanism of the two units A and B, and the motor 163 rotates the shafts 162 carrying the driving clutch members 161 for the continuous rotation or spinning mechanism of the two units. The attendant thereupon selects the unit which he wishes to operate first and, assuming this unit to be the unit A, he throws the switch 201 (Fig. 11) to connect current to the stepping clutch magnet 153 which attracts, upon energization, its armature 151 to displace the clutch arm 147 so as to place the driven clutch member 140 in driving engagement with the driving clutch member 141. The crank 138 (Fig. 9) thus begins to rotate and to reciprocate the plunger 134 for the purpose of reciprocating the pawl 133 relative to the ratchet 132 so as to rotate the shaft 122 and therewith the circular holder of the unit A step by step in clockwise direction, as seen in Fig. 9. The compartments 1–16 of the holder 120 thus pass successively a predetermined position in which the attendant loads the holder by successively inserting into each compartment a receptacle to be sealed. Each compartment is provided with a contact indicated in Fig. 11 by numerals 1–16, these contacts being in serial relation and normally in open position. Assuming that the insertion of the containers to be sealed begins with compartment 1, it will be seen that the contacts 1–16 are successively closed as receptacles are successively inserted into the various compartments for sealing. The stepping operation for loading purposes continues until all of the sixteen compartments are provided with containers to be sealed. At this moment a circuit is closed for the energization of the spin clutch magnet 170 of the unit A, which extends from ground at 202, over the timing device Ta, the brush 203, serially related closed contacts 1–16 of the sixteen compartments now filled with containers, winding of the magnet 170, to battery. The spin clutch magnet 170 energizes, attracts its armature 169, thereby displacing clockwise the clutch arm 167 and moving its driven clutch member 160 into clutching engagement with the rotating drive clutch member 161. The cam arms such as 176—177 secured to the clutch arm 167 (see Figs. 9 and 10) are thereby displaced and move the stepping pawl 133 and the detent 155 out of engagement with the ratchet wheel 132 of the unit A, thereby disabling its stepping mechanism. The shaft 122 of the circular holder 120 of the unit A is now in driving engagement with its shaft 162 and begins to spin, to create the centrifugal forces required for utilizing the contents of the sixteen containers to exert pressure on the glue-carrying and folded sealing portions thereof. The continuous rotation or spinning is continued for a time required for the sealing of the receptacles, which is determined by the timing device Ta shown in Fig. 11.

The timing device Ta is constructed and adjusted so as to move its brush arm 203 from the normal position in which it is shown in Fig. 11, clockwise through 360° responsive to a starting impulse delivered thereto. This impulse is delivered responsive to energization of the spin clutch magnet 170 (upon completion of the loading of the holder 120 of unit A and consequent closure of the series circuit contacts 1–16), from ground at contact 204 which has been actuated by the armature 169 of magnet 170, conductor 205, and over the circuit of the timing device Ta to battery. The brush arm 203 now rotates clockwise in engagement with the segmental contact 206, thus keeping the magnet 170 energized for a predetermined period of time until the brush arm 203 leaves the segmental contact to open the circuit of magnet 170 so as to cause deenergization thereof, for the purpose of releasing its armature 169 and thereby restoring to normal its clutch arm 167 to declutch the shaft 122 of the holder 120 of unit A, to stop the continuous rotation thereof and to position the holder 120 to resume its step-by-step rotation for the discharge of the sealed receptacles therefrom and for reloading its compartments with new receptacles, as described before.

A delay must be interposed at this moment (when the circuit of the spin clutch magnet 170 is interrupted) to prevent immediate restoration of the stepping pawl 133 and detent 155 in engagement with the ratchet 132, because the holder 120 will tend to continue its spinning rotation by its inertia, and reengagement of the stepping pawl and detent with the ratchet wheel would place prohibitive stresses on the mechanism. The clutch arm 167 must therefore be held against complete restoration responsive to deenergization of the magnet 170 to hold the cams 176—177 against releasing the pawl 133 and the detent 155 until the holder 120 is in complete stop position. This delay is interposed as follows:

There is a segmental contact 207 which is engaged by the timing brush arm 203 just before the arm leaves the segmental contact 206 to interrupt the circuit of the spin clutch magnet 170. A circuit is thereby closed from ground on timing brush arm 203, over the segmental contact 207, conductor 208, to the winding of a control relay 209. This relay energizes and attracts its armature 210 to lock the hooklike extension at its free end in back of the locking arm 211 which is associated with the clutch arm 167. It will be recalled that the magnet 170 is at this moment still energized. An instant later, the timing brush arm 203 leaves the segment 206, disconnecting current from the winding of magnet 170. The magnet deenergizes and its armature 169 and associated clutch arm begin to restore. They can restore just sufficiently to declutch the driven clutch member 160 from driving engagement with the driving clutch member 161 and will be held in partially restored position by the hook on the armature 210 which has been attracted by the magnet 209. The cam arms 176—177 carried by the clutch arm 167, which hold the stepping pawl 133 and the detent 155 out of engagement with the ratchet wheel therefore remain in actuated position, holding the pawl and the detent free of the ratchet wheel and the holder can therefore continue to rotate freely by its inertia after it has been declutched from driving engagement with the shaft 162.

It is desirable that this period of free-wheeling rotation by inertia is kept short, and I have therefore provided means for applying a brake force to the shaft of the holder which stops its inertia rotation shortly after the period of positive rotation has been terminated. The brake means comprises a brake member 215 carried on the holder shaft 122 (not shown in Figs. 9–10). Coacting with the brake member 215 is an armature 216 which carries a brake lining for engagement with the brake member. The armature 216 is actuated by a brake magnet 217 which is energized over a circuit including the conductor 218 from a segmental contact 219 which is engaged by the timing brush 203 at the moment when the timing brush leaves the segmental contact 206 to interrupt the circuit of the spin clutch magnet 170. The holder 120, which rotates by its inertia, comes gradually to a stop. The timing brush arm 203 leaves at that moment the segmental contacts 207 and 219, thus interrupting the circuits of the locking relay 209 and of the brake magnet, respectively. The locking relay 209 deenergizes and releases its armature 210, to remove its locking hook from engagement with the locking arm 211, thereby allowing the clutch arm 167 to move to its normal position for the purpose of withdrawing the cam arms 167—177 to normal, to free the stepping pawl 133 and the detent 155 for stepping engagement with the ratchet wheel 132. The step clutch magnet 153 has remained energized throughout the period of continuous rotation of the holder, idling the stepping pawl; and, when the pawl and the associated detent are freed, as described, the step-by-step operation is resumed. The deenergization of the brake magnet 217 causes restoration of the brake armature 216 to permit resumption of the step-by-step rotation of the holder 120 of the unit A without hindrance.

The sealed receptacles are successively removed from the compartments of the holder of unit A, and new receptacles are inserted therein for sealing.

The holder 121 of the unit B is loaded in the same manner as the holder 120 of the unit A, while the holder 120 is subjected to its continuous rotation for spinning its receptacles for sealing purposes, and when its loading is completed, it is similarly subjected to continuous rotation for a predetermined period of time under the control of the timing device T$b$ shown in Fig. 11.

Circuit components associated with the unit B, as shown in the lower portion of Fig. 11, which correspond to like components associated with the unit A, are marked by identical reference numerals each carrying the suffix "$b$." The sequence of operation is identical with that described in connection with unit A.

The units A and B are alternately operated. While the holder of one unit is subjected to the stepping operation for the removal of sealed receptacles therefrom and insertion of new receptacles into the various compartments thereof, the holder of the other unit is subjected to continuous rotation or spinning motion to provide the centrifugal forces for the sealing of the receptacles which have been inserted therein.

The serially related contacts 1–16, which are closed in each unit successively by the insertion of receptacles into the corresponding compartment cages, constitute control and positioning means for governing the operation of the associated holder. Different governing and positioning means may of course be employed, for example, contact means which are disposed peripherally of each holder and actuated in predetermined angular position thereof. The serially related contacts provide a particular advantage because they furnish a control element for efficiently timing the manipulations of the attendant and for always operating the machine with full capacity.

Two separate timing devices T$a$ and T$b$ have been shown, one for each of the units A and B, merely for the sake of convenience. It is understood that in practice a single timing device, for example, a suitable servomechanism, may be used to take the function of the two timing devices shown in Fig. 11.

The brake mechanism for each unit has been shown, for similar reasons of convenient representation, in the form of a relay (217 and 217$b$) coacting with an armature provided with a brake lining for engagement with the corresponding brake member 215 and 215$b$, respectively. Suitable differently constructed brake means may of course be used.

It has been assumed that the machine of Figs. 9–11 requires an attendant. This has been done for purposes of explanation because it is clear of course that the entire operation, including insertion of the receptacles into the holder compartments and removal therefrom, may be made entirely automatic. In such a case the receptacles to be sealed may be delivered by a suitable conveyor or through a chute terminating in two branches, one for each unit A and B. The two branches may terminate as indicated in Fig. 10 by the line 230. Similar chute or conveyor branches indicated by the line 231 may be provided to take care of the discharge of the sealed containers. Thus, whenever the corresponding holder is rotated step by step relative to a predetermined position, a receptacle to be sealed is delivered thereto over the delivery means 230 for insertion in a compartment thereof, and a sealed receptacle is at the same time discharged from the corresponding compartment over the discharge means 231.

The cage for holding a receptacle in position in any of the compartments 1–16 in the structure shown in Figs. 9–10 may be modified by the provision of a rear plate, taking the place of the rear plate 65 of Figs. 6–7, which is pivotally mounted for swinging into open position in the manner of the front plate members 76—78 of Figs. 6–7. Suitable control means may be provided for automatically releasing both such front and rear plates to swing into open position for the removal of a sealed receptacle and for the insertion into the cage of a new receptacle, at the moment when the corresponding compartment is stepped into the predetermined position for discharge and insertion, respectively, and both such plates may then automatically close to hold the new receptacle in sealing position.

The stepping operation should be positive, without overrunning, and suitable known means should therefore be provided for coaction with the stepping mechanism to provide such positive operation.

Speed-reducing and speed control means may be provided wherever desired or necessary, for example, between the drive motors 143/163 and the shafts 142/162 operated thereby.

The structure of Fig. 8 may be modified by substituting stepping means for the continuous drive means, including the worm 109, and the machine of Figs. 9–10 may be similarly modified by substituting continuous drive means for the stepping means including the ratchet 132 and its coacting pawl 153 and detent 155. Continuous drive means, if such are employed, may be controlled and actuated in either case so as to provide rotation in successive angular increments of displacement with stop periods between the successive increments, to allow for discharge of sealed receptacles from and insertion of new receptacles into the sealing compartments when the compartments are in proper discharge and delivery position, respectively.

The machine described with reference to Figs. 1–4 may be modified by the provision of baffle means forming enclosures for guiding receptacles into sealing position relative to the magnetic zone as they are delivered by the lower conveyor belt.

Milling products such as flour and cereal products have been mentioned specifically to give examples of goods that require the protection of perfect sealing, without intending to indicate any inherent limitations. It will be appreciated that there are numerous goods outside the milling and other food industries which will benefit by the sealing method and apparatus disclosed herein.

Certain aspects of the invention may be applicable in instances outside of the specific fields of packaging and sealing goods.

It will be understood from the foregoing explanations that the invention may be used and that changes may be made within the scope and spirit of the appended claims which define what is believed to be new and desired to have protected by Letters Patent of the United States.

I claim:

1. In the packaging of goods of the class described, wherein receptacles which have been filled with amounts of the goods to be packaged are prepared for sealing by placing glue on selected receptacle portions disposed at the corresponding ends thereof and folding such portions upon each other and placing the outside of said folded portions against a backing element, the process of effecting said sealing which comprises the following steps, namely, (1) moving a prepared receptacle with its backing element through a predetermined path to impart centrifugal outwardly acting forces to the goods therein; and (2) maintaining said motion for a predetermined time to cause such centrifugal forces to operate outwardly against said folded receptacle portions so as to press said folded portions substantially throughout the entire extent thereof against said backing element until said portions are adhesively joined by the glue thereon.

2. Apparatus for sealing the open ends of receptacles which have been filled with amounts of goods to be packaged and which have been prepared for sealing by folding upon each other selected glue-carrying receptacle portions disposed at the corresponding ends thereof, said apparatus comprising operating means including a backing member which forms a surface for engagement by the exteriorly disposed folded receptacle portion, of a receptacle to be sealed, and means for rotating said operating means to spin said receptacle through a circular path, for the purpose of subjecting the goods therein to centrifugal forces, whereby such goods are caused to place said folded receptacle portions under pressure to effect the sealing thereof.

3. The apparatus defined in claim 2, comprising retainer means for engagement with sides of said receptacle to hold such sides against deformation in the presence of said centrifugal forces.

4. The apparatus defined in claim 2, comprising a casing, cage means in said casing having side walls for receiving said receptacle for sealing, a wall in said cage means forming said backing member for engagement by the exteriorly disposed folded receptacle portion, and means for adjustably mounting selected side walls of said cage means to accommodate receptacles of varying sizes.

5. The apparatus defined in claim 2, including means for adjustably controlling the duration of rotation of said operating means.

6. Apparatus for sealing receptacles which have been filled with amounts of goods to be packaged, each receptacle having glue-carrying exterior and interior sealing portions which are folded upon each other, said apparatus comprising means forming a rotatable compartment, wall means in said compartment forming a cage for receiving a filled receptacle for sealing, means for adjustably mounting some of said wall means, means for resiliently securing in said cage a receptacle to be sealed with its folded sealing portions backed against a rigid member thereof, means for rotating said compartment to spin said receptacle through a circular path for the purpose of subjecting the goods therein to centrifugal forces, whereby such goods are caused to place said folded receptacle sealing portions under pressure against said rigid cage member to effect uniform sealing thereof, and means in said compartment actuated by centrifugal forces incident to the rotation thereof for pressing said adjustable wall means against sides of said receptacle to prevent deformation of said sides responsive to outward pressure exerted thereon by said goods in the presence of the centrifugal forces acting on such goods.

7. The apparatus defined in claim 6, together with a rotatable base member, means for continuously rotating said base member, means for mounting said compartment on said rotatable continuously rotating base member peripherally thereof, for continuous angular rotation therewith and for rotation individually relative thereto to effect sealing by centrifugal forces of a receptacle that has been inserted therein, means effective in predetermined angular terminal position of said compartment for stopping rotation thereof individually relative to said base member, means for discharging the sealed receptacle from said compartment in said terminal stop position while said stopped compartment is carried by said continuously rotating base member to a predetermined angular initial position, and means for delivering a receptacle to be sealed for insertion into said compartment in said angular initial position, said continuously rotating base member carrying said compartment from said angular initial position to an angular position in which individual rotation thereof is resumed for the purpose of effecting the sealing of the receptacle inserted thereinto in said initial position.

8. Apparatus for sealing receptacles which have been filled with amounts of goods to be packaged, each receptacle having glue-carrying exterior and interior sealing portions which are folded upon each other, said apparatus comprising a rotatable circular holder forming peripherally disposed compartments each for receiving a receptacle to be sealed, a backing member in each compartment for engagement by the exterior glue-carrying sealing portion of the receptacle received in the corresponding compartment, actuating means for rotating said holder step by step to move said compartments relative to a predetermined position in which receptacles to be sealed are successively inserted thereinto each with the exteriorly disposed sealing portion thereof in engagement with the backing member formed in the corresponding compartment, and operating means thereafter effective for continuously rotating said holder to spin said receptacles through a circular path, for the purpose of subjecting the goods in said receptacles to centrifugal forces, whereby such goods are caused to press outwardly against the interior sealing portion of each respective receptacle to press such portions against the associated exterior sealing portions which are in engagement with the corresponding backing members so as to effect uniform sealing therewith.

9. The apparatus defined in claim 8, comprising means governed by said operating means for disabling said step-by-step actuating means.

10. The apparatus defined in claim 8, comprising electrical circuit means governed by the insertion of said receptacles into said compartments for controlling the actuation of said operating means.

11. The apparatus defined in claim 8, comprising means for controlling the duration of rotation of said holder by said operating means.

12. The apparatus defined in claim 8, comprising means for controlling the start of operation of said operating means to cause continuous rotation of said holder, timing means, means governed by said operating means for controlling the operation of said timing means, and means governed by said timing means to control the duration of operation of said operating means.

13. The apparatus defined in claim 8, comprising means for controlling the start of operation of said operating means to cause continuous rotation of said holder, timing means, means governed by said operating means for controlling the operation of said timing means, means governed by said timing means for stopping said operating means so as to terminate the continuous rotation of said holder at the conclusion of a predetermined period of time, and means effective responsive to the stopping of said operating means for resuming the operation of said step-by-step actuating means to rotate said compartments successively relative to a predetermined position in which the sealed receptacles are discharged therefrom.

14. In combination, a rotatable base plate and means for rotating it, a plurality of compartments mounted on said base plate peripherally thereof for rotation therewith and each for individual rotation relative thereto, means for stopping the individual rotation of each compartment while such compartment travels with said base plate through a predetermined sector, and means for delivering an article to said compartment and removing another article therefrom while the compartment travels through said sector.

15. In combination, a circular rotatable holder forming compartments peripherally thereof, actuating means for rotating said holder step by step to move said compartments successively in register with a predetermined position in which articles disposed in the respective compartments are removed therefrom and other articles inserted thereinto, operating means for thereupon continuously rotating said holder for a predetermined period of time, and control means for thereafter resuming the step-by-step rotation of said holder.

References Cited in the file of this patent

UNITED STATES PATENTS

| Number | Name | Date |
|---|---|---|
| 609,472 | Smyser | Aug. 23, 1898 |
| 1,887,699 | Reid | Nov. 15, 1932 |
| 1,998,287 | Pierson et al. | Apr. 16, 1935 |
| 2,089,010 | Voss | Aug. 3, 1937 |
| 2,127,646 | Luery | Aug. 23, 1938 |
| 2,202,213 | Lindholm | May 28, 1940 |
| 2,400,390 | Clunan | May 14, 1946 |
| 2,485,040 | Cupo | Oct. 18, 1949 |